(12) United States Patent
 Li

(10) Patent No.: US 12,656,749 B2
(45) Date of Patent: Jun. 16, 2026

(54) METHODS AND SYSTEMS FOR SELECTING AND CONTROLLING SMART DEVICES

(71) Applicant: Adeia Guides Inc., San Jose, CA (US)

(72) Inventor: Zhiyun Li, Kenmore, WA (US)

(73) Assignee: Adeia Guides Inc., San Jose, CA (US)

( * ) Notice: Subject to any disclaimer, the term of this patent is extended or adjusted under 35 U.S.C. 154(b) by 407 days.

(21) Appl. No.: 18/213,966

(22) Filed: Jun. 26, 2023

(65) Prior Publication Data

US 2024/0427299 A1 Dec. 26, 2024

(51) Int. Cl.
| | |
|---|---|
| *G05B 19/042* | (2006.01) |
| *G06F 3/0482* | (2013.01) |
| *G06F 3/0484* | (2022.01) |
| *G02F 1/29* | (2006.01) |

(52) U.S. Cl.
CPC ......... *G05B 19/042* (2013.01); *G06F 3/0482* (2013.01); *G06F 3/0484* (2013.01); *G02F 1/294* (2021.01); *G05B 2219/2642* (2013.01)

(58) Field of Classification Search
CPC ......... G05B 19/042; G05B 2219/2642; G06F 3/0482; G06F 3/0484; G06F 3/011; G06F 3/04815; G06F 3/04842; G02F 1/294; H04M 1/72415
See application file for complete search history.

(56) References Cited

U.S. PATENT DOCUMENTS

| | | | | |
|---|---|---|---|---|
| 11,172,377 | B2 * | 11/2021 | Aksu | H04W 4/025 |
| 2011/0285513 | A1 * | 11/2011 | Shirai | G08C 17/02 |
| | | | | 340/12.5 |
| 2016/0205501 | A1 * | 7/2016 | Lee | H04W 12/40 |
| | | | | 455/457 |
| 2020/0226836 | A1 * | 7/2020 | Ball | G02B 27/0172 |
| 2022/0078578 | A1 * | 3/2022 | Brumley | G01S 13/767 |
| 2023/0072170 | A1 * | 3/2023 | Kiilerich | H04B 7/0695 |
| 2024/0210601 | A1 * | 6/2024 | Yoshida | G02B 3/14 |

OTHER PUBLICATIONS

"IR Remote Control—Bacics, Operation & Application," [retrieved from URL: https://www.elprocus.com/ir-remote-control-basics-operation-application/], (8 pages).
(Continued)

*Primary Examiner* — Bryan Earles
(74) *Attorney, Agent, or Firm* — HG LAW LLP

(57) ABSTRACT

Systems and methods are provided for identifying devices via a directional signal. A first directional signal having a first solid angle is emitted from a first device during a first time period, and a second directional signal having a second solid angle is emitted from the first device during a second time period. A second device that has received the first signal emitted during the first time period and has received the second signal emitted during the second time period is identified. A third device that has not received the first signal emitted during the first time period and has received the second signal emitted during the second time period is identified. A user interface element based on the identifying the second device and the identifying the third device is generated, for output at the first device.

20 Claims, 10 Drawing Sheets

(56)          References Cited

OTHER PUBLICATIONS

"Quality of laser beam shaping can be enhanced at no extra cost," [retrieved at URL: https://scienmag.com/quality-of-laser-beam-shaping-can-be-enhanced-at-no-extra-cost/], (6 pages), (2019).

Balaji, A. N., et al., "RetroSphere: Self-Contained Passive 3D Controller Tracking for Augmented Reality," Proc. ACM Interact. Mob. Wearable Ubiquitous Technol., 6(4):157:1-157:36 (2022).

Chen, L., et al., "Electrically Tunable Lenses: A Review," Frontiers in Robotics and AI, Systematic Review, 8:1-20 (2021).

Shahinian, H., et al., "Scanning depth sensor for see-through AR glasses," Conference: Optical Design Challenge, 1-6, (2019).

Sousa, M., "How to Synchronize Clocks on Network Devices," [retrieved from URL: https://bigtimeclocks.biz/blogs/news/how-to-synchronize-clocks-on-network-devices], (7 pages), (2021).

* cited by examiner

METHODS AND SYSTEMS FOR SELECTING AND CONTROLLING SMART DEVICES

FIELD OF THE DISCLOSURE

One or more disclosed embodiments are directed toward systems and methods for identifying and selectively controlling devices via varying directional control signals.

SUMMARY

With the proliferation of internet-connected smart devices, such as smart speakers, smart lights, smart refrigerators, smart blinds and smart televisions, controlling one or more smart devices via a remote device, such as via an application running on a smartphone, has become increasingly popular. However, this has given rise to additional problems, such as the increased storage space required to store these applications on the smartphone, and how to control multiple devices in quick succession, because the user interfaces for controlling the different devices are not combined, and need to be accessed separately. There are further challenges when attempting to control smart devices via an extended reality system. For example, because augmented reality devices do not typically comprise touchscreens, user interface manipulation can be challenging when switching between different applications for controlling different internet-connected devices. In order to reduce the number of manual user interface manipulations and storage requirements associated with controlling smart connected smart devices, there is a need to provide an improved way of controlling multiple smart devices in the same location.

To help address these problems, systems and methods are provided herein that enable improved device identification via varying directional signals. In accordance with some aspects of the disclosure, a method is provided. The method includes emitting, from a first device during a first time period, a first directional signal having a first solid angle, and emitting, from the first device during a second time period, a second directional signal having a second solid angle. A second device that has received the first signal emitted during the first time period and has received the second signal emitted during the second time period is identified. A third device that has not received the first signal emitted during the first time period and has received the second signal emitted during the second time period is identified. A user interface element based on the identifying the second device and the identifying the third device is generated for output at the first device.

In an example system, a user uses an augmented reality system to identify and control a smart device in a room. The augmented reality system emits, for example, a directional infrared beam, with a solid angle that increases with time. In a first time period, the beam has a relatively small solid angle, and is received only by a second device. In a second time period, the beam has a larger solid angle, and is received by the second and a third device. By identifying the time period in which the beam was received, the order in which the devices received the beams can be identified. A list of identified devices may be generated for output at the augmented reality device, with the list being ordered based on the order that the devices received the signals. In addition, a user may select a device from the list to control. An application associated with the device may be automatically launched or, in another example, an API may be utilized to send a command directly to the selected device. In this manner, a user is able to select a device by aiming the augmented reality system in the direction of the device to control, and the number of user interface manipulations can be greatly reduced.

The first directional signal may be focused in a first direction, and the second directional signal may be focused in a second direction. The first direction may be the same as the second direction. The first directional signal may be configured to carry a repeating payload during the first time period. Identifying the second device may further comprise receiving a response signal from the second device; and the second solid angle may be larger than the first solid angle.

The first directional signal may be configured to carry a first count, and the second directional signal may be configured to carry a second count. Identifying the second device may further comprise identifying that the second device has received the signal carrying the first count during the first time period, and has received the second signal carrying the second count during the second time period. Identifying the third device may further comprise identifying that the third device has not received the signal carrying the first count during the first time period and has received the second signal carrying the second count during the second time period.

Generating the user interface element may further comprise generating the user interface element comprising an ordered list comprising identifiers of the second and third devices. The ordered list may be sorted based on one or more signals received by the second and third devices.

The first directional signal may be configured to carry a payload that includes an indicator of the first device, an indicator of a profile associated with the first device, and a timestamp of the first time period. An indicator of the second device and a signal timestamp associated with the second device may be received at the first device. A command to control a function of the second device may be transmitted from the first device.

A user interface input associated with the second device may be received at the first device. The directional signal may be configured based on the received user interface input, and the configured directional signal may be emitted from the first device. The first device may comprise a controllable lens with an electrically controllable focal length configured to change the solid angle of the first and second directional signals.

BRIEF DESCRIPTIONS OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

The above and other objects and advantages of the disclosure may be apparent upon consideration of the following detailed description, taken in conjunction with the accompanying drawings, in which.

Figure 9:
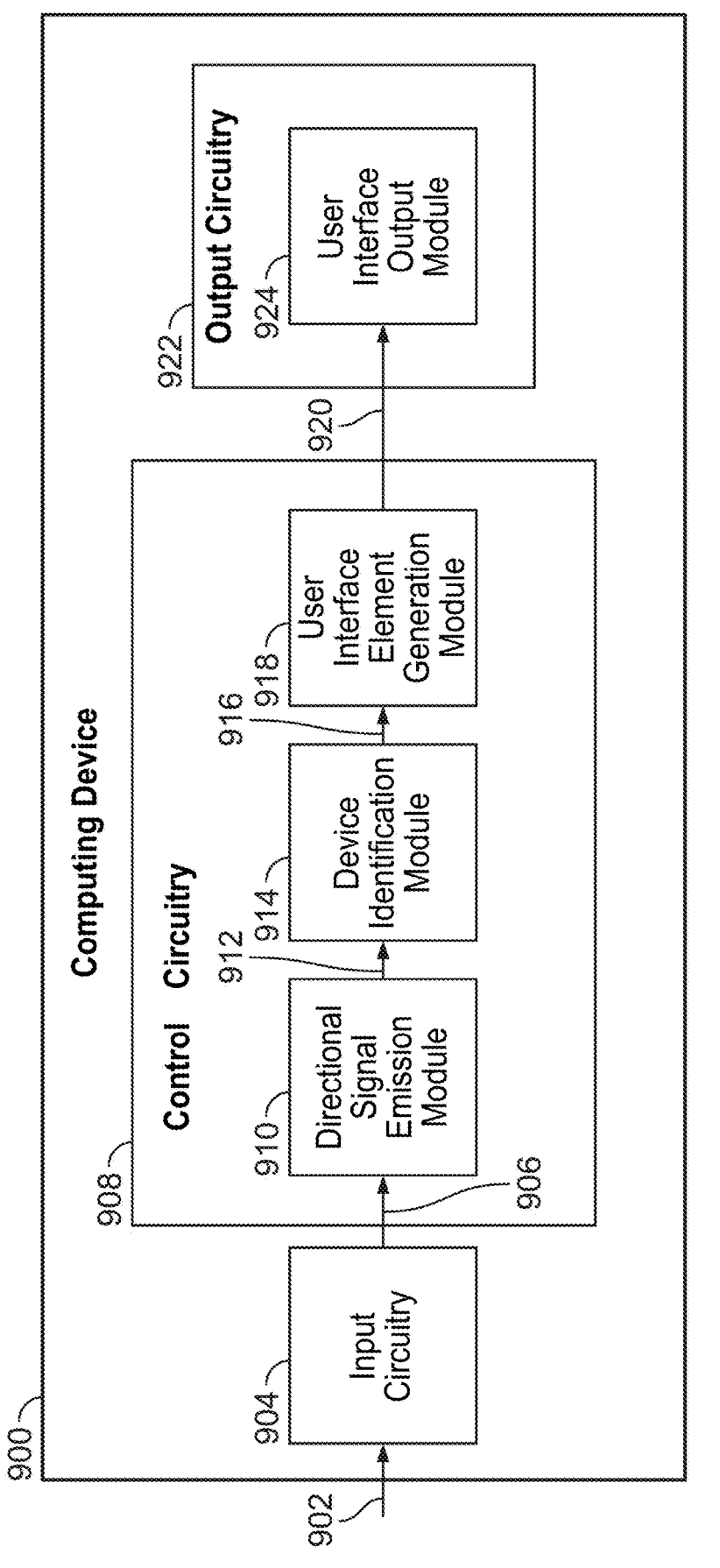
Figure 10:
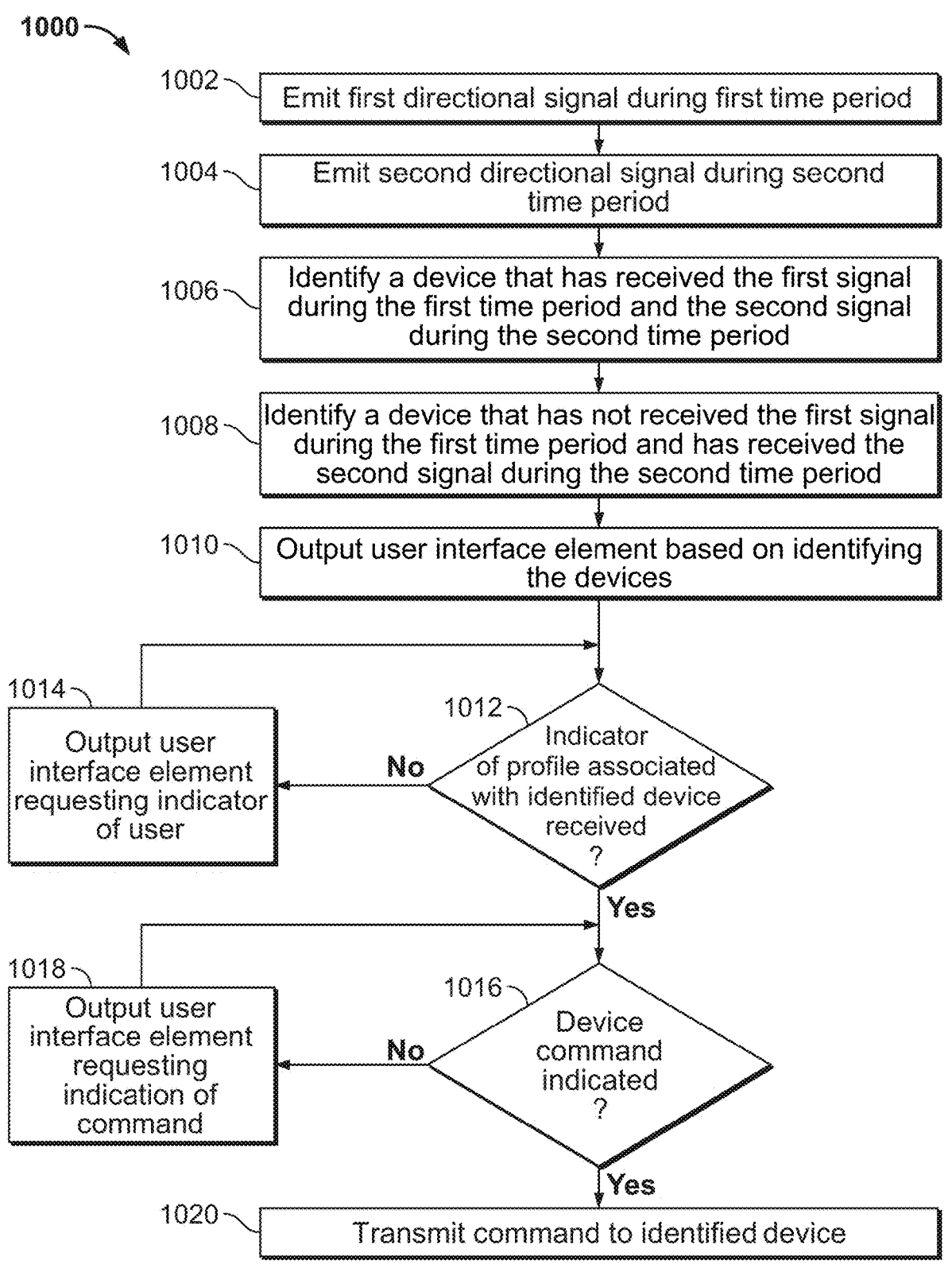

FIG. 9 shows a block diagram representing components of a computing device and dataflow therebetween for enabling the identification of devices via directional signals, in accordance with some embodiments of the disclosure; and FIG. 10 shows a flowchart of illustrative steps involved in enabling the identification of devices via directional signals, in accordance with some embodiments of the disclosure.

DETAILED DESCRIPTION

A directional signal is any suitable signal for communicating with a device, including, for example, an infrared beam, a radio frequency beam, a Wi-Fi signal, a Bluetooth Low Energy signal and/or a Zigbee signal, that can be directed, controlled and/or varied. For example, the signal may be directed via one or more lenses. In another example, the signal may be controlled and/or varied via beamforming, antenna design, signal configuration, adjusting parameters of the signal (such as the phase and amplitude of the signal), and/or one or more lenses, mirrors and/or reflectors placed in the signal path. The lenses may, for example, be controllable to change a direction of the beam.

A solid angle is the two-dimensional angle in three-dimensional space that a signal subtends at a point, for example, where a signal is emitted from an emitter. A signal having a larger solid angle will cover a larger volume at a given distance or radius from the emitter than a signal having a relatively smaller solid angle. In addition to, or alternatively to, having varying solid angles, emitted signals may have different coverage, varied radiation patterns, varied emission patterns, wider or narrower coverage and/or patterns, and/or different cross-sectional areas and/or volumes at a given depth or radius from an emitting device. In addition to receiving an emitted signal, a smart device may be controllable via an emitted signal.

The disclosed methods and systems may be implemented on one or more devices, such as computing devices. As referred to herein, the device can be any device comprising a processor and memory, for example, a television, a smart television, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, a smartwatch, a smart speaker, an augmented reality headset, a mixed reality device, a virtual reality device, a gaming console, or any other television equipment, computing equipment, or wireless device, and/or combination of the same.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media cards, register memory, processor caches, random access memory (RAM), etc.

Figure 1:
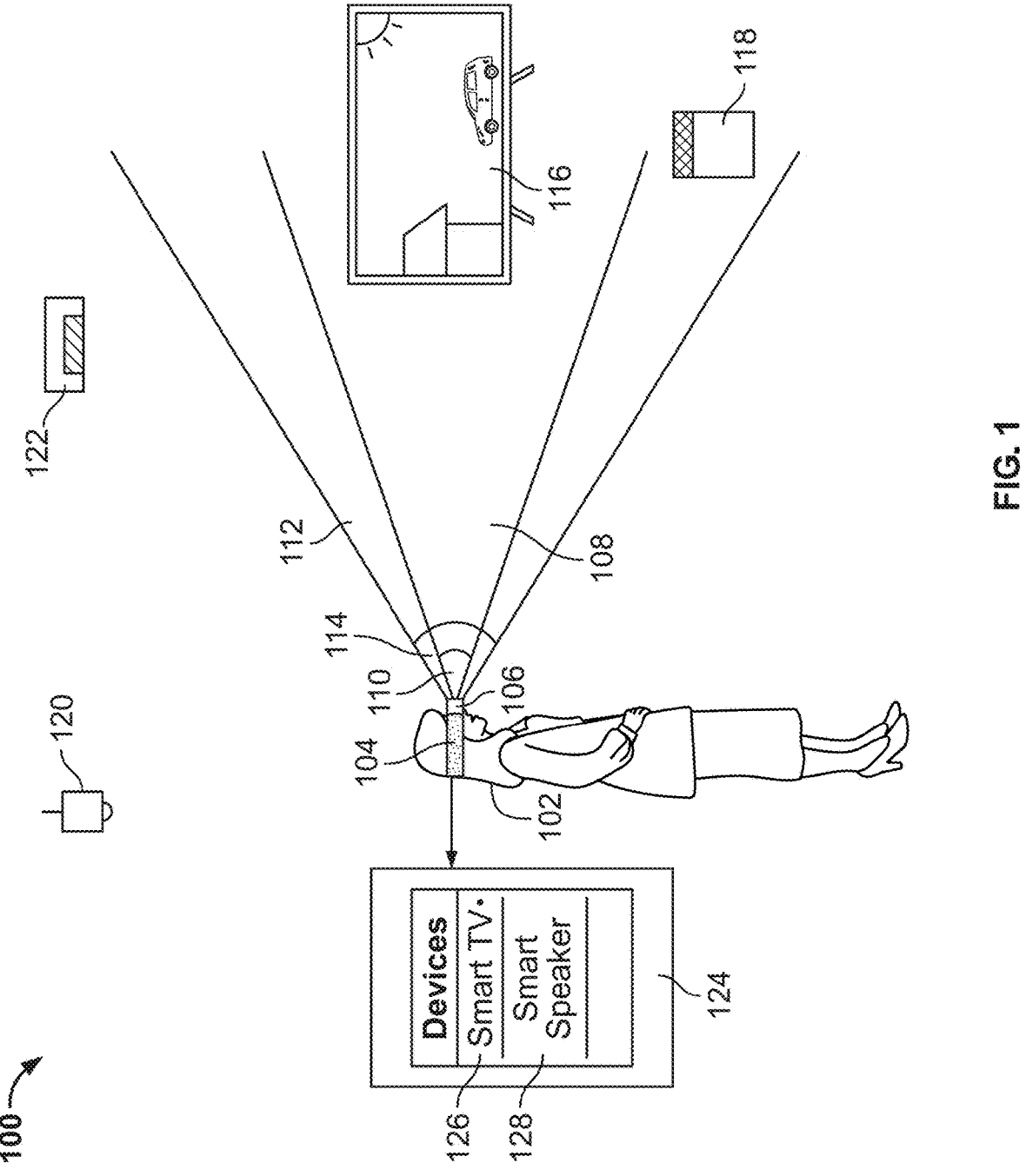
FIG. 1 shows an example environment for enabling the identification of devices via directional signals, in accordance with some embodiments of the disclosure.

FIG. 1 shows an example environment for the identification of devices via directional signals, in accordance with some embodiments of the disclosure. The environment 100 comprises a user 102, a device 104, and a plurality of smart devices 116, 118, 120, 122, each comprising a receiver for receiving a signal from the device 104. In this example, the device 104 is an augmented reality or extended reality headset, but the device 104 may be any suitable device that emits or controls the emission of a signal including, for example, any suitable extended reality device, smartphone, tablet and/or computer. The device 104 comprises an emitter 106 for emitting a first signal 108 during a first time period. In this example, the first signal 108 is an infrared beam having a first radiation pattern characterized at least in part by a first solid angle 110. The device emitter 106 emits a second signal 112 during a second time period. In this example, the second signal 112 is an infrared beam having a second radiation pattern characterized at least in part by a second solid angle 114. Although two beams having two different solid angles are shown, any suitable number of beams and corresponding time periods are contemplated. The diagram in FIG. 1 shows triangular cross-sections of the conical signals 108, 112; it is contemplated that the signal will be, for example, broadly conical and comprise a volume. The user may initiate the signal 108, 112 from the device 102 via any suitable input including, for example, tapping the device 102, making a gesture that is detected by the device 102, and/or uttering a wake word that is received via a microphone associated with the device 102. The signal will be emitted from the device 102, towards a device of the smart devices 116-122 that the user is looking at, or towards.

As the first solid angle 110 is smaller than the second solid angle 114, only the first smart device 116, in this example smart television, receives the signal during the first time period. As the second solid angle 114 is larger than the first solid angle 110, both the first smart device 116, and a second smart device 118, in this example smart speaker, receive the second signal 112 during the second time period. In this example, neither of the first or second signals reaches the third and fourth smart devices 120, 122, in this example a smart lightbulb and a smart air conditioning unit.

The device 104 identifies that the first smart device 116 received the first signal during the first time period and the second signal during the second time period, and that the second smart device 118 received the second signal during the second time period. This may be, for example, via one or more messages transmitted to the device 104 from each of the smart devices 116, 118 that received a signal 108, 112. At the device 104, a user interface 124 is generated for output that indicates the smart devices 116, 118, that received a signal. In this example, the user interface 124 has user interface elements 126, 128 for each of the smart devices that received a signal, and generates the user interface elements 126, 128 for output in the order that the smart devices 116, 118 received the signals 108, 112.

The signal 108, 112 may comprise a modified infrared beam so that it can selectively control multiple devices within a field of view. In some examples, the infrared beam may be adjusted by an electrical beam expander. The first signal 108 may comprise a relatively narrow beam, pin-pointing a relatively small area, then it may expand to a relatively wider beam, over one or more subsequent time periods, to cover a relatively larger area, or areas. The beam may expand from a minimum radius or coverage pattern to a maximum radius or coverage pattern. In other examples, the beam may expand from a maximum radius or coverage pattern to a minimum radius or coverage pattern. In this way, multiple devices 116-122 within a field of view may receive the transmitted signals at different times according to their distance from a center line of the beam, which also follows the user's 102 sightline. The order in which a device 116-122 received the beam may be used to order the devices on a display of the device 104. The devices 116-122 may also have user interface elements associated with them to enable one or more commands to be transmitted to the devices 116-122. In further examples, a degree of personalization based on, for example, a user profile and/or a device profile may be initiated on a device 116-122 receiving the signal 108, 112.

Figure 2:
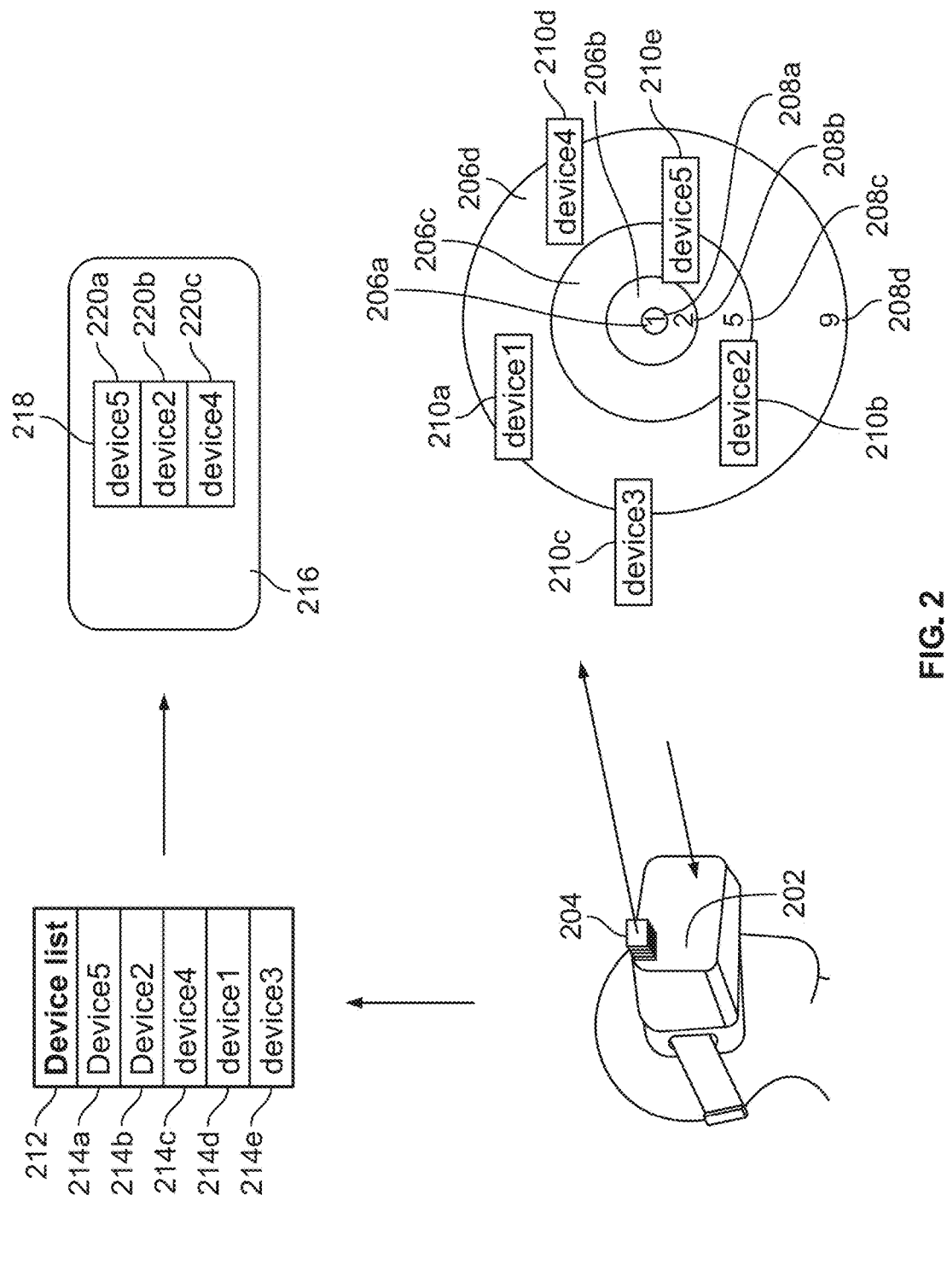
FIG. 2 shows another example environment for enabling the identification of devices via directional signals, in accordance with some embodiments of the disclosure.

FIG. 2 shows another example environment for the identification of devices via directional signals, in accordance with some embodiments of the disclosure. The environment 200 comprises a user, a device 202, and a plurality of smart devices 210a-210e, each comprising a receiver for receiving a signal from the device 202. In this example, the device 202 is an augmented reality headset or an extended reality headset, but the device 202 may be any suitable device that controls the emission of a signal including, for example, any suitable extended reality device, smartphone, tablet and/or computer. The device 202 comprises an emitter 204 for emitting a first signal 206a during a first time period, a second signal 206b during a second time period, a third signal 206c during a third time period, and a fourth signal 206d during a fourth time period. In this example, the signals 206a-206d are infrared beams having respective solid angles. Although four beams having four different solid angles are shown, any suitable number of beams and corresponding time periods are contemplated. The diagram in FIG. 2 shows circular cross-sections of the conical signals 206a-206d; it is contemplated that the signal will be, for example, broadly conical and comprise a volume. The user may initiate the signal 206a-206d from the device 202 from via any suitable input including, for example, tapping device 202, making a gesture that is detected by the device 202, and/or uttering a wake word that is received via a microphone associated with the device 202. The signal will be emitted from the device 202, towards a device of the smart devices 210a-210e that the user is looking at, or towards.

In this example, the signals 206a-206d are configured to carry respective counts 208a-208d, which help the device 202 to determine an order in which the smart devices 210a-210e received emitted signals. In some examples, a signal carries a count 208a-208d by being modulated to carry a respective count. In this example, the first signal 206a carries a count of one, the second signal 206b carries a count of two, the third signal 206c carries a count of five, and the fourth signal 206d carries a count of nine. In this example, the first, third, and fourth smart devices 210a, 210c, 210d receive the fourth signal 206d during the fourth time period, but they have not received the first, second or third signals 206a-206c during the respective first to third time periods. Continuing the example, the second device 210b receives the third signal 206c during the third time period and the fourth signal 206d during the fourth time period, but does not receive the first and second signals 206a, 206b during the respective first and second time periods. The fifth device 210e receives the second signal 206b during the second time period, the third signal 206c during the third time period and the fourth signal 206d during the fourth time period, but does not receive the first signal 206a during the first time period. On receiving a signal, a device 210a-210d saves an indication of the count 208a-208e associated with the signal.

The device 202 identifies the signals and respective time periods for which a signal is received for each of the smart devices 210a-210e based on the count 208a-208e. This may be, for example, via one or more messages transmitted to the device 202 from each of the smart devices 210a-210e that received a signal 206a-206d. At the device 202, a device list 212 is generated, ordering the devices 214a-214e based on the order that the signals were received. A user interface 216 and corresponding user interface elements 220a-206c is generated indicating, for example, an ordered list 218 of the first three devices 210b, 210d, 210e that received a signal. On receiving input associated with a device from the list 218, a control app associated with the device may be initiated. In another example, a native app may provide one or more commands for controlling the selected device via, for example, an API. As the list is ordered based on the distance from the center of the emitted signals 206a-206e, the device at the top of the list is most likely to be the device that the user intended to control, and so forth. In some example, only devices that meet a threshold confidence level may be included on a list, such that the list is of a dynamic length. The threshold confidence level may be based on, for example, how far a device is from the center of the signal. In other examples, the list may be of a fixed length and only, for example, the three most likely target devices are included.

Figure 3:
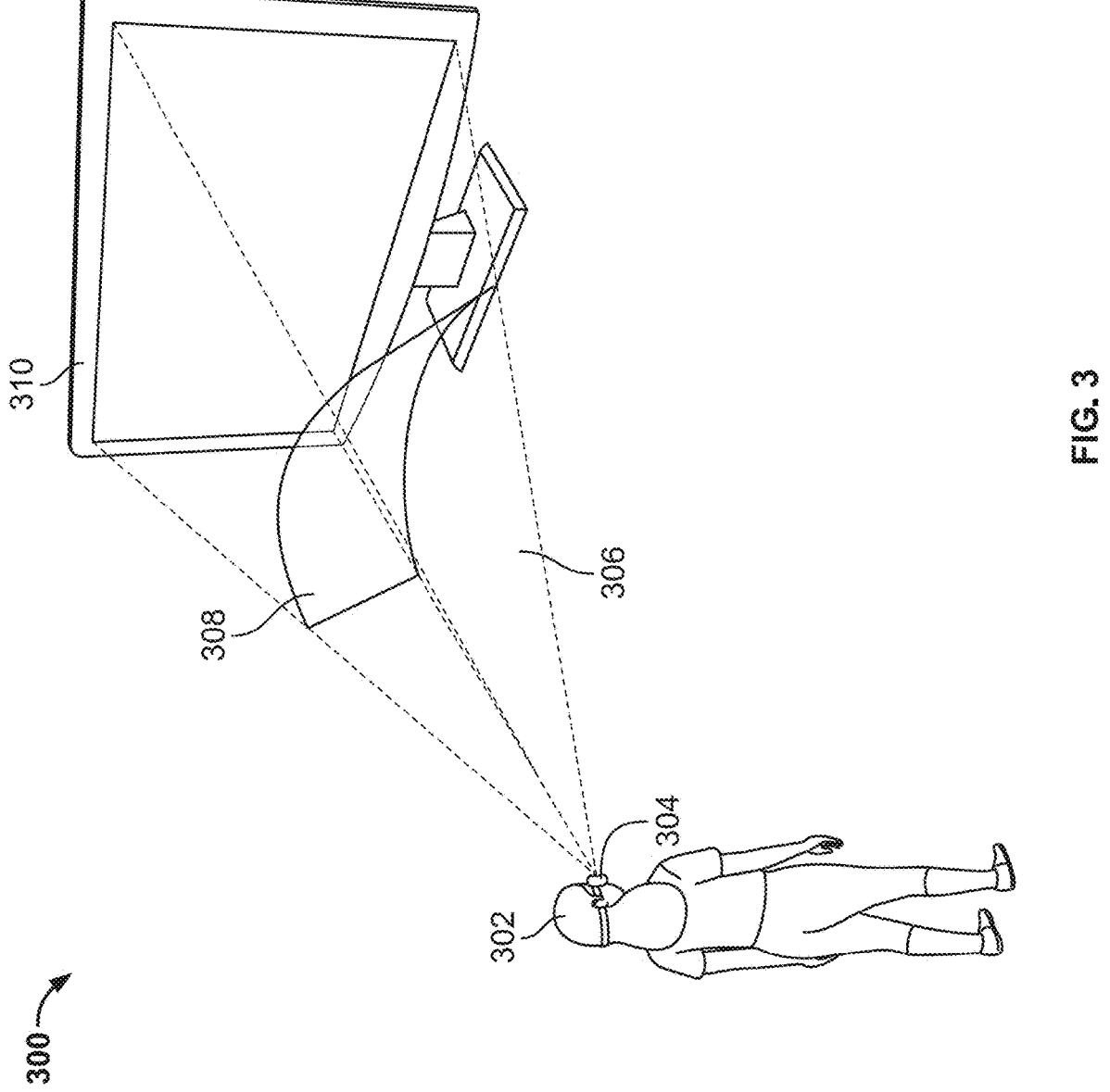
FIG. 3 shows another example environment for enabling the identification of devices via directional signals, in accordance with some embodiments of the disclosure.

FIG. 3 shows another example environment for the identification of devices via directional signals, in accordance with some embodiments of the disclosure. The environment 300 comprises a user 302 and a device 304. In this example, the device 304 is an augmented reality headset, but the device 304 may be any suitable device that controls the emission of a signal including, for example, any suitable extended reality headset. The device 304 comprises an emitter for emitting a signal 306. The signal comprises a solid angle 308. A solid angle is the two-dimensional angle in three-dimensional space that a signal subtends at a point, for example, where a signal is emitted from an emitter. A signal having a larger solid angle will cover a larger volume than a signal having a relatively smaller solid angle. In this example, the signal 306 is received by a receiver of a smart television 310.

Figure 4:
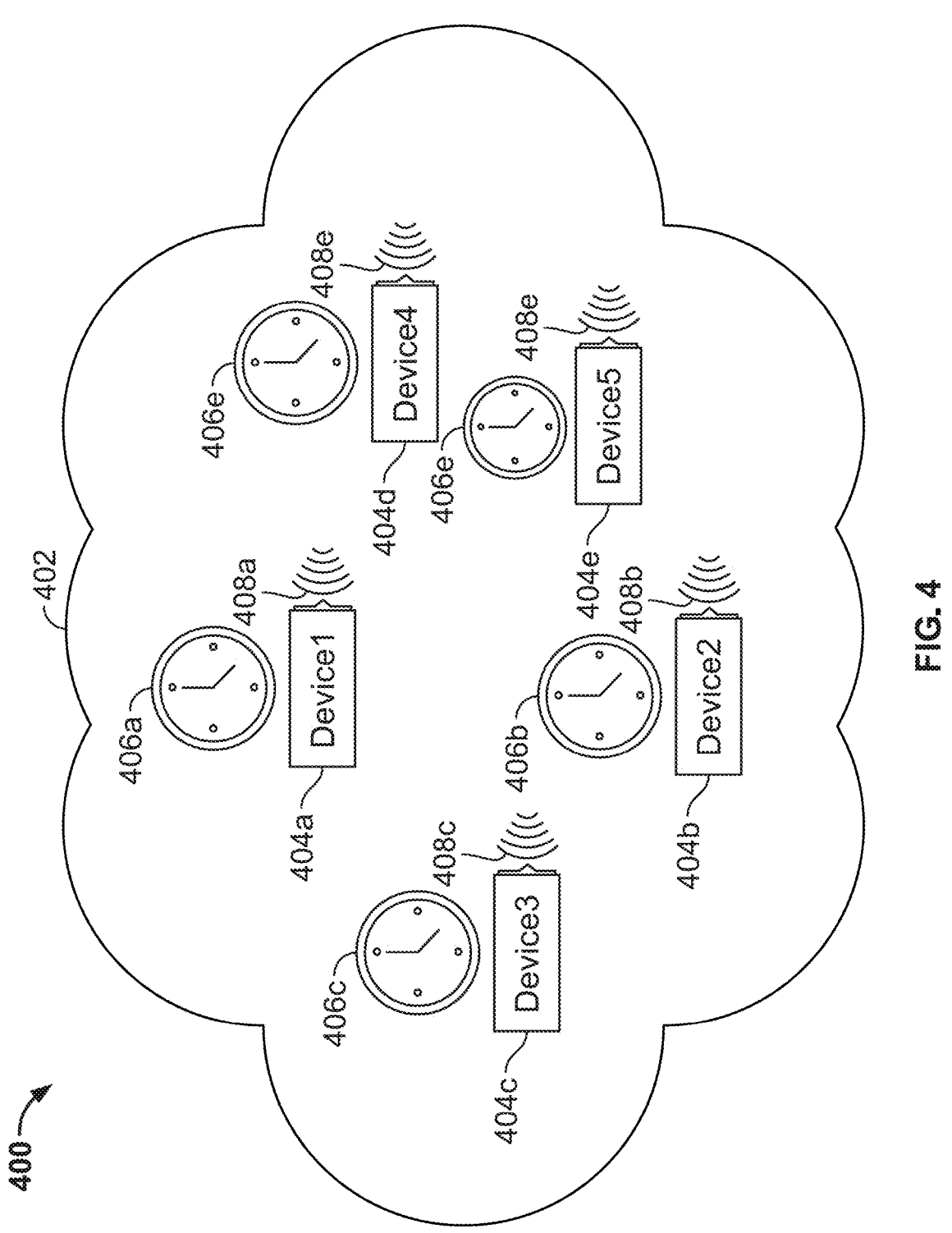
FIG. 4 shows another example environment for enabling the identification of devices via directional signals, in accordance with some embodiments of the disclosure.

FIG. 4 shows another example environment for the identification of devices via directional signals, in accordance with some embodiments of the disclosure. The environment 400 comprises a network 402, such as the internet, and a plurality of smart devices 404a-404e. The network may comprise wired and wireless means. The smart devices 404a-404e synchronize accurate times 406a-406e via transmitters 408a-408e, and the network 402. The transmitters 408a-408e may be any suitable network component for transmitting a signal from one device to another device via a network. How accurately the times are synchronized may depend on how fast the directional signal expands, the proximity of the smart devices 404a-404e to one another, and/or the number of devices to be listed in a list of identified devices. In an example, if the directional signal expands from 5° to 30° in 500 ms, and the smart devices 404a-404e are spaced such that the devices are 5° apart, then the clock may only need accuracy of $$\frac{500 \text{ ms}}{(30-5)/5} = 100 \text{ ms}.$$

In some examples, the smart devices 404a-404e may transmit time data directly to one another. In other examples, the smart devices 404a-404e may synchronize times via, for example, a local server. Clock synchronization over a network may reach an accuracy of sub-millisecond, or sub-microsecond, in local network. In any of the embodiments described herein, a device may record the time at which a signal was received, based on the output of a synchronized clock, and the time may be transmitted as a timestamp to the device outputting the signal. In this manner, the order in which the devices receive the signal may be determined, instead of utilizing the aforementioned count.

Figure 5:
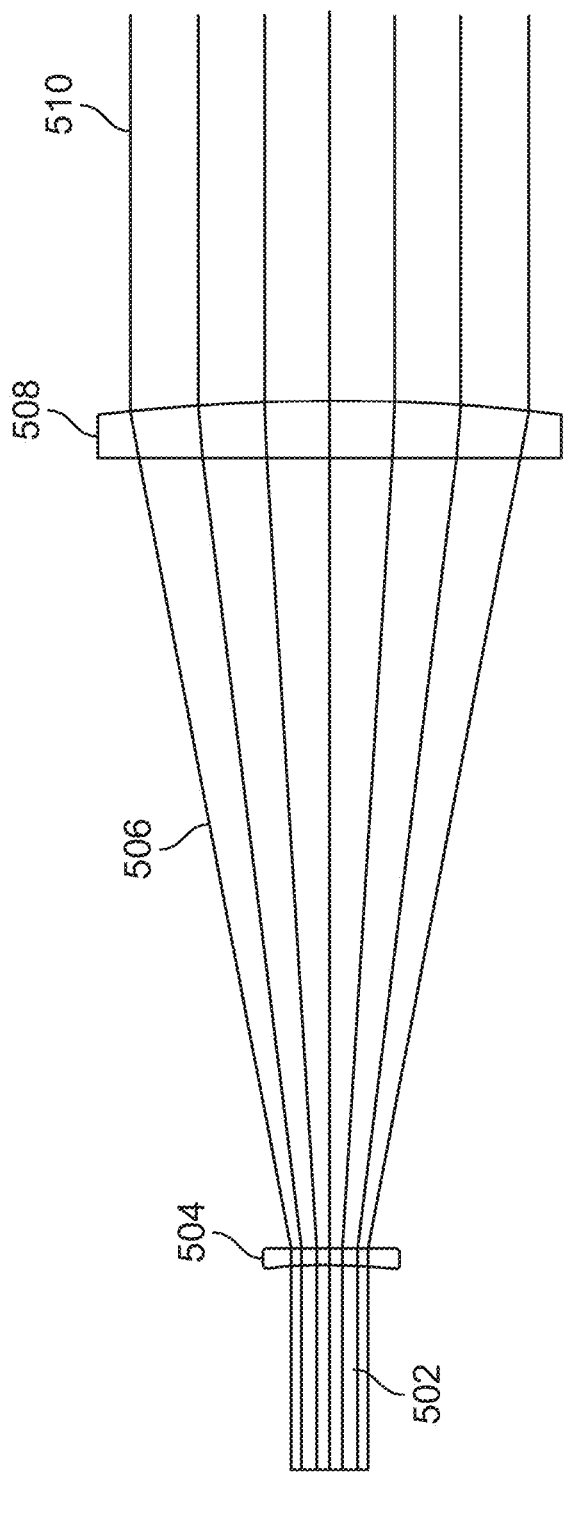
FIG. 5 shows an example optical beam expander, in accordance with some embodiments of the disclosure.

FIG. 5 shows an example optical beam expander, in accordance with some embodiments of the disclosure. The environment comprises an output signal 502, an objective lens 504 and an image lens 508. Although the depicted beam expander shows two lenses 504, 508, any number of suitable lenses may be used to achieve a desired output signal. In some examples, the output of a signal emitter may be increased in order to compensate for any decrease in beam intensity. The output signal may be an infrared beam that passes through the objective lens 504. The objective lens expands the output signal, to create an expanded signal 506 covering a relatively large area. The expanded signal passes through the image lens 508 to produce a signal 510 of a predetermined radius. Either, or both, of the objective lens 504 and the image lens 508 may be tunable to alter the focal length of the lens, thereby creating signals of different radii. In another example, the radius of the output signal may be reduced to create a reduced signal covering a relatively small area. In some examples, either, or both, of the objective lens 504 and the image lens 508 may comprise an electrically tunable lens, such as a piezoelectric-actuated lens. A piezoelectric-actuated lens may comprise a plurality of piezo actuators and a fluid lens sited between two membranes. The actuators may manipulate one or more of the membranes in order to change the focal length of the fluid lens. In some examples, the response time of a piezoelectric lens can be in the order of 0.15 ms, the focal length of the lens may range between −143 mm and +167 mm, and the power consumption of the lens may be relatively low due to the electrostatic driving nature of a piezoelectric lens. In other examples, the lenses may be motor-controlled lenses that are controllable to alter the focal length of the lenses. The beam expander of FIG. 5 and/or tunable lenses may be used with any of the embodiments discussed herein.

Figure 6:
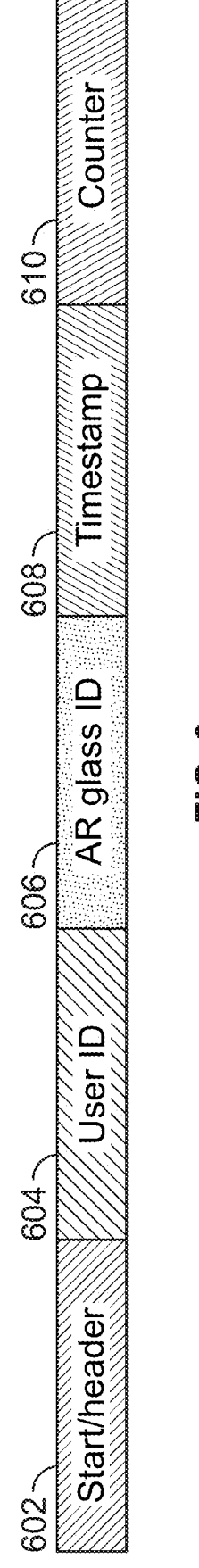
FIG. 6 shows an example signal payload, in accordance with some embodiments of the disclosure.

FIG. 6 shows an example signal payload, in accordance with some embodiments of the disclosure. The signal transmitted from any of the devices 102, 202, 302, 702, 802 described herein may be configured, and/or modulated, to include any suitable information, including the information described herein. The signal payload 600 comprises a start or header section 602, a transmitting device user identification section 604, a transmitting device identification section 606, a transmitting timestamp section 608, and a counter section 610. The transmitting timestamp section 608 may indicate a timestamp at which a first signal of a plurality of signals is transmitted from the device 102, 202, 302, 702, 802. On receiving the signal, a smart device may compare the indicated timestamp to a synchronized timestamp in order to determine a delay associated with receiving the signal. Alternatively or in combination, the device 102 (for example) may perform this comparison to determine the delay. In some examples, the transmitting device identification section 606 may be for a specific device identification, such as an augmented reality glass identification. The transmitting device identification may be an identification of any of the devices 102, 202, 302, 702, 802 described herein. In some examples, the transmitting device user identification, the transmitting device identification and the timestamp may be combined to serve as, or to generate, a unique identification for a signal. In some examples, the payload 600 may be a repeating payload, with the same payload transmitted for each time period. In an example, if a payload takes 25 ms to transmit, then in 500 ms, the payload can be repeated 20 times. During the 500 ms duration, the signal may expand from a minimum radius or coverage pattern to a maximum radius or coverage pattern within a field of view. In another example, the signal decreases from a maximum radius or coverage to a minimum radius or coverage pattern within a field of view. When the signal is at a minimum radius it may pinpoint a relatively small area, including a relatively small number of devices, and when the signal is at a maximum radius it may cover a relatively large area, including a relatively large number of devices. Each device within the signal coverage may receive the complete payload. The payload 600 may be used with any of the embodiments discussed herein.

Figure 7:
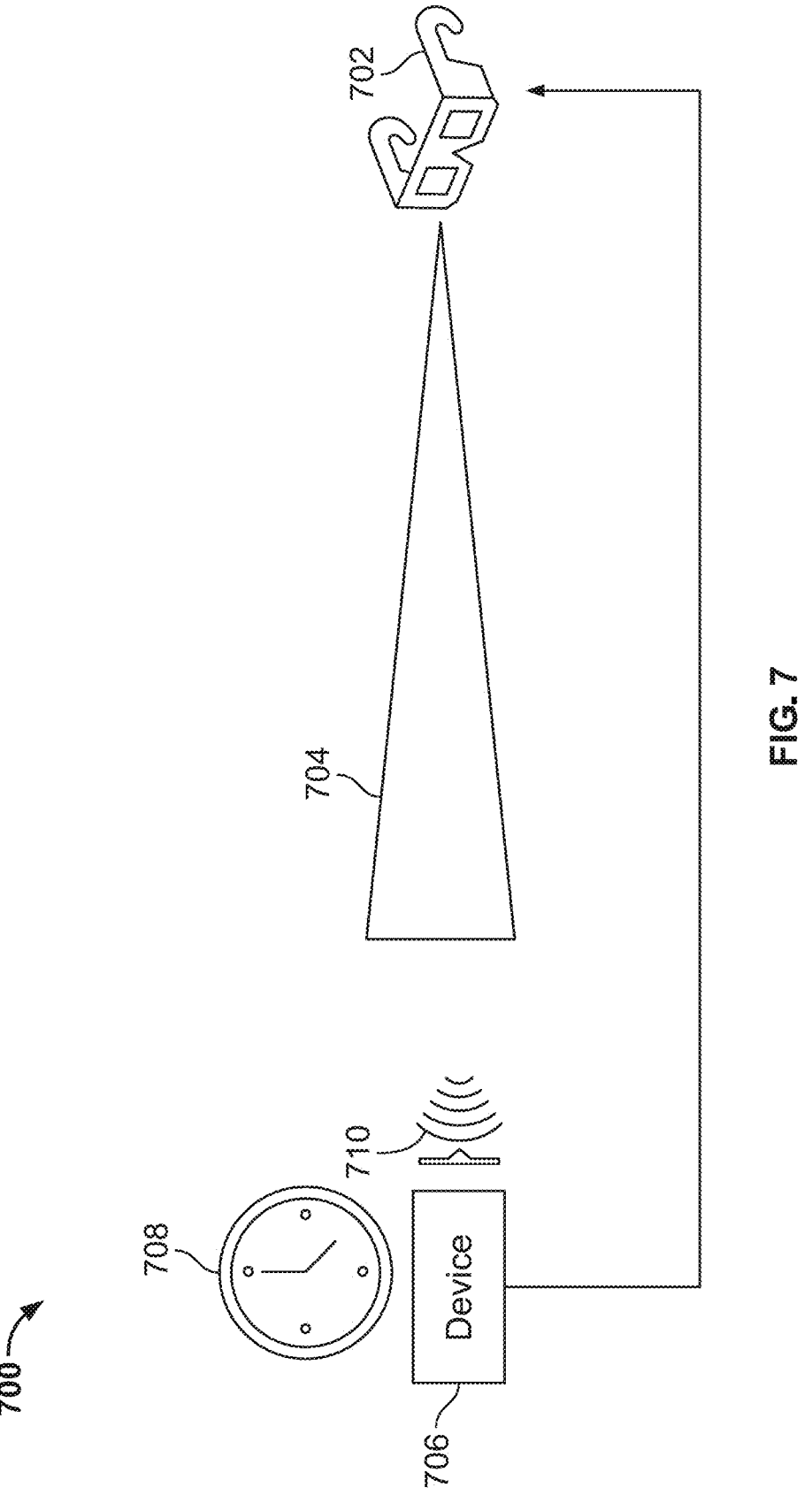
FIG. 7 shows another example environment for enabling the identification of devices via directional signals, in accordance with some embodiments of the disclosure.

FIG. 7 shows another example environment for the identification of devices via directional signals, in accordance with some embodiments of the disclosure. The environment 700 comprises a device 702 and a smart device 706. In this example, the device 702 is an augmented reality headset, but the device 702 may be any suitable device that controls the emission of a signal including, for example, any suitable extended reality headset. A signal 704, such as an infrared beam, is emitted from the device 702, and is received at the smart device 706. The signal 704 comprises, for example, a user identification an identification of the device 702 and a timestamp. On receiving the signal 704, the smart device 706 responds to the device 702.

Once a smart device, such as smart device 706, receives the signal 704 from the transmitting device 702, the smart device 706 may record the current timestamp, and subsequently receive a complete payload from the transmitting device 702. From the payload, the smart device 706 may determine who sent the signal 704, from a transmitting user identification section of the payload, and which device sent the signal 704, from a transmitting device identification section of the payload. In response to determining the transmitting user and device, the smart device 706 may fetch personalization data relating to the identified user. In some examples, the smart device 706 may indicate that it has received the signal 704 and/or is fetching personalization data via, for example, blinking an integrated light. The smart device 706 may transmit a notification, for example, via the internet, to the transmitting device 702, as specified by the transmitting device section in the payload of the signal 704. After each smart device responds to a transmitted signal, the transmitting device 702 may receive a list of responses, from smart devices that have received the signal, in the order of delay. The device 702 may then determine how to generate indicators for applications associated with the smart devices based on, for example, the order in which the smart devices received the signal, or signals, from the transmitting device 702.

Figure 8:
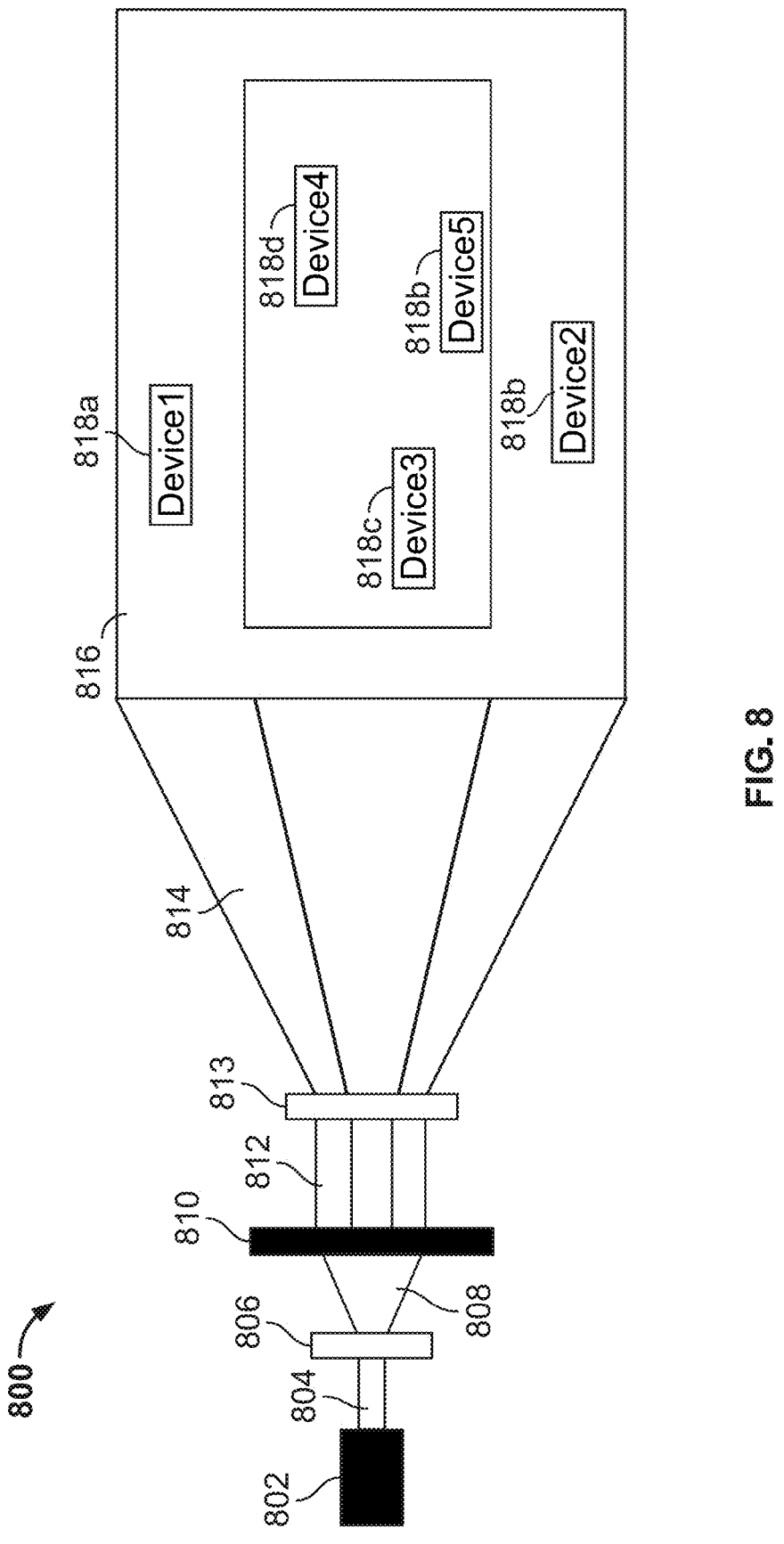
FIG. 8 shows another example environment for enabling the identification of devices via directional signals, in accordance with some embodiments of the disclosure.

FIG. 8 shows another example environment for the identification of devices via directional signals, in accordance with some embodiments of the disclosure. The environment 800 comprises a device 802, an objective lens 806, a signal shaper 810, and an image lens 813. In some examples, the device 802 is an extended reality device comprising an infrared beam emitter. An output signal 804, such as an infrared beam, is emitted from the device 802. The output signal 804 passes through the objective lens 806, creating an expanded signal 808. The signal may expand from a minimum radius or coverage pattern to a maximum radius or coverage pattern. In another example, the signal may decrease from a maximum radius or coverage pattern to a minimum radius or coverage pattern. When the signal is at a minimum radius it may pinpoint a relatively small area, including a relatively small number of devices, and when the signal is at a maximum radius it may cover a relatively large area, including a relatively large number of devices. The expanded signal 808 passes through the signal shaper 810, to form a shaped signal 812. The shaped signal 812 passes through the objective lens 813 to form signal 814. The signal 814 comprises a broadly square or rectangular region 816 with a hollow center, though other shapes are contemplated. In this example, first and second smart devices 818a, 818b fall within the shaped region of the beam, and third to fifth smart devices 818c-818e fall outside of the shaped region of the beam. This example of a rectangular region comprising a hollow center may be utilized in, for example, a warehouse where a user may want to turn on lights outside a field of view to avoid glare. In some examples, only a signal shaper 810 may be utilized to shape the beam, without the use of the objective lens 806 and/or the image lens 813.

In some examples, a transmitting device may be able to handle only one user. In this case, each time the transmitting device receives a communication from a different smart device, it may process only the current request, until the user explicitly dismisses an application associated with a smart device, or exits from the selected application on the transmitting device. Although the embodiments discussed herein show signals of an expanding radius, any embodiment discussed herein may utilize signals of decreasing radius.

In some examples, in addition to transmitting the signals at different radii, the signals may be transmitted at different power levels as well. In such an embodiment, instead of (or in addition to), identifying a timestamp and/or count associated with receiving a signal at a smart device, the smart device may identify a power level associated with the signal. In this manner, the smart device may transmit an indication of the received power levels, or alternatively the highest, or lowest, power of a received signal to the transmitting device, and the transmitting device may utilize that information to identify an order in which the smart devices received the signals. For example, a first signal may be transmitted at a low power level, and a second signal may be transmitted at a higher power level. A first smart device, closest to the center of the transmitted signal, may receive a signal of a first radius at the low power level and subsequently a signal of a second radius at the higher power level. A second smart device, farther away from the center of the transmitted signal, may receive only the signal having the second radius at the higher power level. In this example, the first smart device may transmit an identifier and an indication of the received power levels of the received to the transmitting device. The second device may transmit an identifier and an indication of the power level of the received signal to the transmitting device. The transmitting device may compare the indications of the power levels of the received signals at the smart devices and may generate, for output, a list indicating the order in which the signals were received, based on the indicated power levels received from the smart devices.

In a further example, in addition to transmitting the signals at different radii, the signals may be modulated at different frequencies as well. In such an embodiment, instead of (or in addition to), identifying a timestamp and/or count associated with receiving a signal at a smart device, the smart device may identify a frequency associated with the signal. In this manner, the smart device may transmit an indication of the received frequencies, or alternatively the highest, or lowest, frequency of a received signal to the transmitting device, and the transmitting device may utilize that information to identify an order in which the smart devices received the signals. For example, a first signal may be transmitted at a low frequency, and a second signal may be transmitted at a higher frequency. A first smart device, closest to the center of the transmitted signal, may receive a signal of a first radius at the low frequency and subsequently a signal of a second radius at the higher frequency. A second smart device, farther away from the center of the transmitted signal, may receive only the signal having the second radius at the higher frequency. In this example, the first smart device may transmit an identifier and an indication of the received frequencies of the received to the transmitting device. The second device may transmit an identifier and an indication of the frequency of the received signal to the transmitting device. The transmitting device may compare the indications of the frequencies of the received signals at the smart devices and may generate, for output, a list indicating the order in which the signals were received, based on the indicated frequencies received from the smart devices. In some examples, the signals may be transmitted at different radii, power levels and frequencies.

FIG. 9 shows a block diagram representing components of a computing device and dataflow therebetween for enabling the identification of devices via directional signals, in accordance with some embodiments of the disclosure. Computing device 900 (e.g., computing devices 102, 202, 302, 702, 802) comprises input circuitry 904, control circuitry 908 and output circuitry 922. Control circuitry 908 may be based on any suitable processing circuitry (not shown) and comprises control circuits and memory circuits, which may be disposed on a single integrated circuit or may be discrete components and processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i9 processors) or multiple different processors (e.g., an Intel Core i5 processor and an Intel Core i7 processor) and/or a system on a chip (e.g., a Qualcomm Snapdragon 888). Some control circuits may be implemented in hardware, firmware, or software.

Input is received 902 by the input circuitry 904. The input circuitry 904 is configured to receive inputs related to a computing device. For example, this may be via a gesture detected via an extended reality device. In other examples, this may be via a touchscreen, a Bluetooth and/or Wi-Fi controller of the computing device 900, an infrared controller, a keyboard, a mouse and/or a microphone. In another example, the input may comprise instructions received via another computing device. The input circuitry 904 transmits 906 the user input to the control circuitry 908.

The control circuitry 908 comprises a directional signal emission module 910, a device identification module 914, a user interface element generation module 918, and output circuitry 922 comprises a user interface output module 924. The input is transmitted 906 to the directional signal emission module 910, where one or more signals are emitted during respective one or more time periods. The signal may expand from a minimum radius or coverage pattern to a maximum radius or coverage pattern. When the signal is at a minimum radius it may pinpoint a relatively small area, including a relatively small number of devices, and when the signal is at a maximum radius it may cover a relatively large area, including a relatively large number of devices. On outputting the one or more signals, an indication is transmitted 912 to the device identification module 914, where one or more devices that have received the one or more transmitted signals during respective one or more time periods are identified. An indication of the identified device, or devices, is transmitted 916 to the user interface element generation module 918, where user interface elements pertaining to the identified device, or devices, are generated. The generated user interface elements are transmitted 920 to the output circuitry 922, where they are output by the user interface output module 924, for example, the user interface elements may be displayed at a display of the computing device 900.

FIG. 10 shows a flowchart of an example process 1000 including illustrative steps involved in enabling the identification of devices via directional signals, in accordance with some embodiments of the disclosure. Process 1000 may be implemented, in whole or in part, on any of the aforementioned computing devices (e.g., computing devices 102, 202, 302, 702, 802, e.g., by way of executing one or more instructions or routines stored in the memory or storage of a device). In addition, one or more actions of the process 1000 may be incorporated into or combined with one or more actions of any other process or embodiments described herein.

At 1002, a first directional signal is emitted during a first time period, and at 1004, a second directional signal is emitted during a second time period. The first directional signal may expand from a minimum radius or coverage pattern to the second directional signal having a maximum radius or coverage pattern. When the signal is at a minimum radius it may pinpoint a relatively small area, including a relatively small number of devices, and when the signal is at a maximum radius it may cover a relatively large area, including a relatively large number of devices. At 1006, a device that has received the first signal during the first time period and the second signal during the second time period is identified. At 1008, a device that has not received the first signal during the first time period and has received the second signal during the second time period is identified. At 1010, a user interface element based on identifying the devices is generated for output, and is output. At 1012, it is determined whether an indicator of a profile, or profiles, associated with the identified device, or devices, has been received. If an indicator of the profile, or profiles, has not been received, then the process proceeds to 1014, where an indicator of the user is requested, for example, via a user interface element generated for output at a device emitting the first signal and, on receiving an indication of the user, the process loops back to 1012. If an indication of the user has been received, the process proceeds to 1016, where it is determined whether a command to transmit to a device has been indicated. If a command has not been indicated, the process proceeds to 1018, where a user interface element requesting the indication of a command is generated for output, and the process loops back to 1016. If a device command has been received, the process proceeds to step 1020, where the command is transmitted to the identified device.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be illustrative and not limiting. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method, comprising:

emitting, from a first device during a first time period, a first directional signal having a first solid angle and a first power level;

emitting, from the first device during a second time period, a second directional signal having a second solid angle and a second power level, wherein the first and second solid angles are different and the first and second power levels are different;

identifying, based at least in part on receiving a first indication from a second device, the second device that has received the first directional signal emitted during the first time period and has received the second directional signal emitted during the second time period, wherein the first indication indicates the first and second power levels;

identifying, based at least in part on receiving a second indication from a third device, the third device that has not received the first directional signal emitted during the first time period and has received the second directional signal emitted during the second time period, wherein the second indication indicates the second power level; and generating, for output at the first device, a user interface element based on the identifying the second device and the identifying the third device.

2. The method of claim 1, wherein:

the first directional signal is focused in a first direction;

the second directional signal is focused in a second direction; and the first direction is the same as the second direction.

3. The method of claim 1, further comprising configuring the first directional signal to carry a first count, and configuring the second directional signal to carry a second count;

wherein identifying the second device further comprises identifying that the second device has received the first directional signal carrying the first count during the first time period, and has received the second directional signal carrying the second count during the second time period; and wherein identifying the third device further comprises identifying that the third device has not received the first directional signal carrying the first count during the first time period and has received the second directional signal carrying the second count during the second time period.

4. The method of claim 1, wherein:

generating the user interface element further comprises generating the user interface element comprising an ordered list comprising identifiers of the second and third devices; and the ordered list is sorted based on one or more signals received by the second and third devices.

5. The method of claim 1, further comprising configuring the first directional signal to carry a repeating payload during the first time period.

6. The method of claim 1, further comprising configuring the first directional signal to carry a payload comprising:

an indicator of the first device;

an indicator of a profile associated with the first device; and a timestamp of the first time period.

7. The method of claim 6, further comprising:

receiving, at the first device:

an indicator of the second device; and a signal timestamp associated with the second device; and transmitting, from the first device, a command to control a function of the second device.

8. The method of claim 1, further comprising:

receiving a user interface input, at the first device, associated with the second device;

configuring, based on the received user interface input, the first directional signal; and emitting the configured first directional signal from the first device.

9. The method of claim 1, wherein the first device comprises a controllable lens with an electrically controllable focal length configured to change the respective first and second solid angles of the first and second directional signals.

10. The method of claim 1, wherein:

identifying the second device further comprises receiving a response signal from the second device; and the second solid angle is larger than the first solid angle.

11. A system comprising:

input/output circuitry configured to:

receive an input at a first device;

processing circuitry configured to:

emit, from the first device during a first time period, a first directional signal having a first solid angle and a first power level;

emit, from the first device during a second time period, a second directional signal having a second solid angle and a second power level, wherein the first and second solid angles are different and the first and second power levels are different;

identify, based at least in part on receiving a first indication from a second device, the second device that has received the first directional signal emitted during the first time period and has received the second directional signal emitted during the second time period, wherein the first indication indicates the first and second power levels;

identify, based at least in part on receiving a second indication from a third device, the third device that has not received the first directional signal emitted during the first time period and has received the second directional signal emitted during the second time period, wherein the second indication indicates the second power level; and generate, for output at the first device, a user interface element based on the identifying the second device and the identifying the third device.

12. The system of claim 11, wherein:

the processing circuitry configured to emit the first directional signal is further configured to focus the first directional signal in a first direction;

the processing circuitry configured to emit the second directional signal is further configured to focus the second directional signal in a second direction; and the first direction is the same as the second direction.

13. The system of claim 11, wherein:

the processing circuitry is further configured to:

configure the first directional signal to carry a first count, and configure the second directional signal to carry a second count; and the processing circuitry configured to identify the second device is further configured to identify that the second device has received the first directional signal carrying the first count during the first time period, and has received the second directional signal carrying the second count during the second time period; and the processing circuitry configured to identify the third device is further configured to identify that the third device has not received the first directional signal carrying the first count during the first time period and has received the second directional signal carrying the second count during the second time period.

14. The system of claim 11, wherein:

the processing circuitry configured to generate the user interface element is further configured to generate the user interface element comprising an ordered list comprising identifiers of the second and third devices; and the ordered list is sorted based on one or more signals received by the second and third devices.

15. The system of claim 11, wherein the processing circuitry is further configured to configure the first directional signal to carry a repeating payload during the first time period.

16. The system of claim 11, wherein the processing circuitry is further configured to configure the first directional signal to carry a payload comprising:

an indicator of the first device;

an indicator of a profile associated with the first device; and a timestamp of the first time period.

17. The system of claim 16, wherein the processing circuitry is further configured to:

receive, at the first device:

an indicator of the second device; and a signal timestamp associated with the second device; and transmit, from the first device, a command to control a function of the second device.

18. The system of claim 11, wherein:

the input/output circuitry is further configured to receive a user interface input, at the first device, associated with the second device; and the processing circuitry is further configured to:

configure, based on the received user interface input, the first directional signal; and emit the configured first directional signal from the first device.

19. The system of claim 11, wherein:

the first device comprises a controllable lens with an electrically controllable focal length; and the processing circuitry is further configured to control the focal length of the lens to change the respective first and second solid angles of the first and second directional signals.

20. The system of claim 11, wherein:

the processing circuitry configured to identify the third device is further configured to receive a response signal from the third device; and the second solid angle is larger than the first solid angle.

* * * * *